United States Patent [19]
Greco et al.

[11] 3,862,059
[45] Jan. 21, 1975

[54] COPOLYMERS OF DIALLYLDIALKYLAMMONIUM COMPOUNDS, ANION PERMOSELECTIVE MEMBRANES BASED THEREON AND PROCESS FOR PREPARING SAID MEMBRANES

[75] Inventors: Francesco Greco; Paolo Longi, both of Milan; Romano D'Angelo, Brugherio; Antonio Chiolle, Ferrara; Lino Credali, Casalecchio, all of Italy

[73] Assignee: Montecatini Edison S.P.A., Milan, Italy

[22] Filed: May 4, 1973

[21] Appl. No.: 358,182

[30] Foreign Application Priority Data
May 10, 1972 Italy .............................. 24171-A/72

[52] U.S. Cl. ........................... 260/2.1 C, 260/80.73
[51] Int. Cl. ........................................... C08f 15/40
[58] Field of Search ...................... 260/2.1 C, 80.73

[56] References Cited
UNITED STATES PATENTS
3,347,832  10/1967  Mills .................................. 260/72

FOREIGN PATENTS OR APPLICATIONS
5,390   5/1961   Japan

Primary Examiner—Melvin Goldstein
Attorney, Agent, or Firm—Sheldon Palmer; Hubbell, Cohen & Stiefel

[57] ABSTRACT

Copolymers including diallyldialkylammonium compounds of the formula:

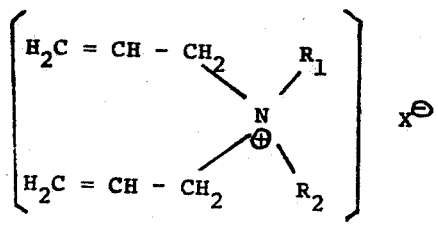

wherein $R_1$ and $R_2$ are independently selected from the group consisting of lower alkyl, halogen substituted lower alkyl and phenyl and X is OH, a halogen or an inorganic or organic anion, alkenyl monomers, such as methyl vinyl ketone and halogen containing vinyl monomers, are useful in the preparation of anion permoselective membranes.

12 Claims, No Drawings

COPOLYMERS OF DIALLYLDIALKYLAMMONIUM COMPOUNDS, ANION PERMOSELECTIVE MEMBRANES BASED THEREON AND PROCESS FOR PREPARING SAID MEMBRANES

BACKGROUND OF THE INVENTION

1. Field of the Invention

The present invention relates to copolymers of

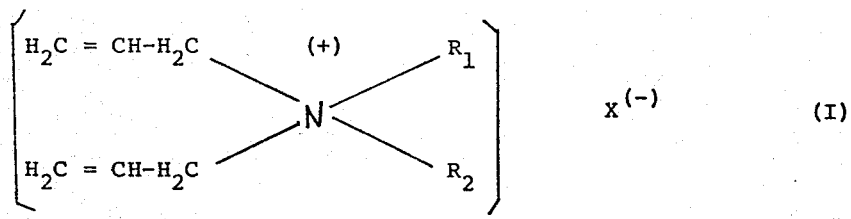

diallyldialkylammonium compounds, to anion permoselective membranes based on said copolymers and to processes for preparing such membranes.

2. Description of the Prior Art

Linear homopolymers of diallyldialkylammonium salts and copolymers thereof with various monomers are known, among which are included acrylonitrile and acrylamide. These polymeric materials, which are usually soluble in water, are employed as coagulants, flocculating agents and bacteriostatic agents.

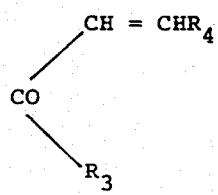
(II)

Homopolymers of triallylethylammonium salts and tetraallylammonium salts which are cross-linked during the polymerization thereof and which are therefore insoluble in water are known as well. Such polymeric materials are generally used as ion exchange resins. These known resins, however, exhibit a high degree of swelling in water, so that the ratio, by volume, between wet resin and dry resin is 1.8 for the homopolymers of triallylethylammonium salts, and 1.2 for the homopolymers of tetrallylammonium salts, even though they are highly cross-linked.

The polymeric materials prepared from the above diallyldialkylammonium chloride are very difficult to transform into films or membranes because brittle or remarkably water-swellable articles are always obtained when attempts to do so are made.

In particular, the copolymers of the diallyldialkylammonium salts and acrylonitrile or acrylamide are polymeric materials which are difficult to transform into films and to crosslink and, accordingly, they provide very stiff membranes having a low chemical stability in both alkaline and acid media. Consequently, they can hardly be used as anion permoselective membranes.

SUMMARY OF THE INVENTION

It is an object of this invention to provide novel copolymers of diallyldialkylammonium compounds which are free from the disadvantages associated with the known polymers and copolymers of this type.

It is another object of the invention to provide anion permoselective membranes based on these novel copolymers and methods for preparing same.

According to the invention, there is provided, in one aspect thereof, a novel class of high molecular weight copolymers of diallyldialkylammonium compounds which comprise, in chemically combined form:

A. at least one diallyldialkylammonium compound;
B. at least one vinyl monomer containing labile hydrogen atoms, and;
C. at least one vinyl monomer containing halogen atoms.

The diallyldialkylammonium compounds (A) according to the invention, have the general formula (I)

wherein $R_1$ and $R_2$ are independently selected from the group consisting of lower alkyl, halogen-substituted lower alkyl and phenyl, and X is OH, a halogen or an inorganic or organic anion. Preferably $R_1$ and $R_2$ are methyl or ethyl and X is chlorine, and thus the preferred compounds are diallyldimethylammonium chloride and diallyldiethylammonium chloride.

The vinyl monomers (B) according to the invention are alkenylketones having the general formulae (II) and (III):

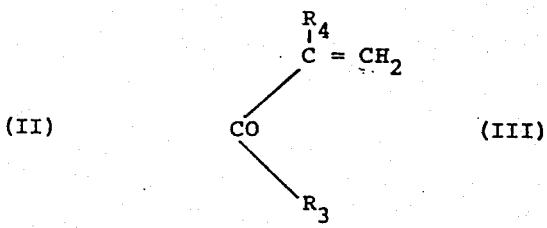
(III)

wherein $R_3$ and $R_4$ are independently selected from the group consisting of hydrogen, lower alkyl and halogen-substituted lower alkyl.

A preferred compound is methylvinylketone.

The vinyl monomers (C) according to the invention may be vinylidene chloride and/or α-chloroacrylonitrile.

The copolymers of the diallyldialkylammonium compounds which form part of this invention may be prepared according to conventional polymerization methods in the presence of radical initiators.

A preferred method of preparation comprises polymerizing the monomers, in the absence of oxygen, at about 50°C, in a dimethylsulphoxide solution, in the presence of a radical initiator such as ammonium persulphate, persulphate/bisulphite, α-α′-azoisobutyronitrile, benzoyl peroxide and the like.

These linear copolymers are characterized by the presence in their polymeric chains, of six-membered rings, of the piperidine type, having the general formula (III):

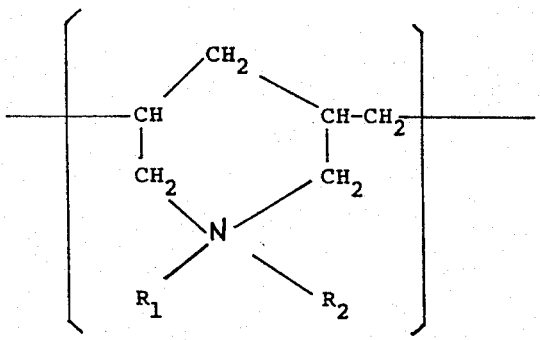

The presence of these rings is evidenced by the absence, in the IR-spectrum, of absorption bands due to unsaturations of the vinyl type, derived from free double bonds present in the starting monomeric unit of the diallyldialkylammonium compounds.

The other two monomers (B) and (C) polymerize according to the conventional polymerization scheme for vinyl monomers.

The structure of these copolymers is linear, in general, as shown by their solubility in certain solvents, such as, for example, formamide, dimethylsulphoxide, γ-butyrolactone, dimethylformamide and the like.

The molar ratios among the various components of the copolymers may vary over wide ranges.

A preferred group of copolymers is constituted by polymeric materials comprising, in chemically combined form:

from 15 to 55 mol % of diallyldialkylammonium compound,
from 5 to 80 mol % of a vinyl monomer of type (B), and
from 5 to 50 mol % of a vinyl monomer of type (C).

Such copolymers are characterized by an inherent viscosity, measured in dimethylformamide at 30°C, which is generally between 0.1 and 2.5 dl/g.

In general, these copolymers are soluble in dimethylsulphoxide, dimethylformamide, water and methanol, and insoluble in aromatic and aliphatic hydrocarbons, ketones and ethers.

The copolymers of this invention, when subjected to heating, preferably in the presence of bifunctional ketone and/or aldehyde compounds, form cross-linked polymeric materials which are practically insoluble and non-swellable in the solvents mentioned hereinabove for the linear copolymers.

The copolymers according to the present invention may be usefully employed in all fields requiring polymeric materials containing highly polar ammonium groups such as, for example, ion exchange resins, flocculating agents or stiffening agents for paper or fibers.

A particularly advantageous use of the copolymers of this invention consists in their use as polymeric cross-linked membranes which are permoselective to anions.

Thus, the membranes which are permoselective to anions, and which form part of this invention, comprise cross-linked copolymers of compounds of diallyldialkylammonium with monomers of the type (B) and (C) hereinabove described. The qualitative and quantitative composition of these membranes depends on the chemical, physical, electrical and mechanical characteristics to be attained.

It has been found that the exchange capacity of the membranes according to the invention depends on the content of diallyldialkylammonium compounds. Likewise it is possible to regulate the degree of cross-linking under heating as well as certain mechanical, physical and chemical characteristics, by suitably adjusting the content of the other two vinyl monomers (B) and (C).

A group of copolymers particularly suited for the membranes according to the invention is constituted by polymeric materials containing from 1.5 to 10%, preferably from 2.5 to 5% by weight of nitrogen and from 10 to 50%, preferably from 20 to 30% by weight of chlorine in chemically combined form.

Particularly advantageous results are obtained starting from linear terpolymers constituted by

| | |
|---|---|
| diallyldiethylammonium chloride | 10–55 mol % |
| methylvinylketone | 5–80 mol % |
| vinylidene chloride | 5–50 mol % |

The anion permoselective membranes are prepared from the above indicated terpolymers by a simple and inexpensive process which, according to this invention, comprises, in order, the following steps:

a. the preparation of a solution of the linear terpolymer in an organic solvent;
b. the formation of the membrane by casting the solution onto a flat glass or metal plate and by subsequently evaporating the solvent at a temperature below 100°C, but preferably ranging from 60° to 80°C; and
c. the cross-linking of the membrane by heating same at a temperature between 80° and 180°C (self-cross-linking), preferably in the presence of small amounts of bifunctional ketone and/or aldehyde compounds (co-cross-linking), which may be advantageously admixed with the terpolymer in step (a) during the dissolution thereof in the organic solvent.

The method for preparing the membranes according to the invention is very simple and can be easily and economically carried out on a commercial scale, since there is no necessity to operate under non-evaporative conditions and, moreover, the cross-linking of the membranes occurs in a rather short time. The organic solvents to be used for preparing the terpolymer solution in step (a) of the process may be selected from a large group of sufficiently volatile solvents.

Particularly advantageous results are achieved when using dimethylsulphoxide, formamide, dimethylformamide, γ-butyrolactone and the like.

The amount of terpolymer present in the solution usually varies from 5 to 60% by weight with respect to the solution.

Particularly satisfactory results are obtained with solutions containing from 10 to 20% by weight of terpolymer.

When using bifunctional ketone and/or aldehyde compounds as cross-linking agents, these latter are admixed with the terpolymer solution in amounts ranging between 0.1 and 20, preferably between 0.5 and 3 parts per hundred by weight with respect to the terpolymer.

The bifunctional ketones and aldehydes to be employed for this purpose may be selected from a large group of compounds. Particularly suitable compounds are: terephthalic aldehyde, glyoxal, acetylacetone, acetonylacetone and the like.

The temperature of this step must be lower than the temperature at which cross-linking of the terpolymer starts. In general this step is performed at temperatures around room temperature and in any case always below 100°C.

The transformation of the terpolymer solution into membranes is carried out in step (b) of the process, at first by spreading the solution onto a glass plate (or a plate of any other suitable material) by means of a film-spreader, and then by evaporating the solvent under controlled conditions.

For this purpose, the temperature, though lower than that at which the terpolymer begins to cross-link, must be sufficiently high to allow the removal of the solvent within a relatively short time.

For these reasons, it is preferably performed at temperatures between 40° and 80°C and, at any rate, always lower than 100°C.

The time required to evaporate the solvent depends on the thickness of the membrane to be prepared and on the temperture at which it is effected; generally the evaporation time varies from 30 minutes to 24 hours.

This step (b) is generally carried out by placing the glass (or other) plate on which the terpolymer had been spread, into an oven or a furnace at a temperature and for a time as specified hereinabove.

The membrane cross-linking is carried out in step (c) of the process by heating the membrane at temperatures between 80° and 180°C for between 30 minutes and 24 hours. Both temperature and cross-linking time also depend on the presence or absence of the cross-linking agent.

In the absence of such bifunctional ketones or aldehydes, the temperature and cross-linking time (self-cross-linking due to the presence of vinylidene chloride) are respectively between 110° and 180°C and between 8 and 24 hours.

On the other hand, when the bifunctional compound is present, the cross-linking temperature and time are less and are respectively between 80°C and 120°C and between 30 minutes and 8 hours.

According to the present invention, cross-linking of the copolymer occurs contemporaneously, both by self-cross-linking caused by the presence of compound (C) and by the action of the bifunctional ketone and/or aldehyde. A highly cross-linked membrane is thus obtained, which in any case maintains its excellent mechanical and electrical properties.

It should be pointed out that both temperature and cross-linking time depend on the quantity of bifunctional compound, and more particularly, the higher the quantity of the latter, the lower the temperature and the shorter the cross-linking time.

The membrane cross-linking is usually carried out by placing the plate, on which the membrane has formed, into an oven or a furnace at a temperature and for a time corresponding to those indicated above.

In order to facilitate the removal of the cross-linked membranes from the glass plate, the whole may be immersed in an organic solvent, such as, for example, a lower aliphatic alcohol, at tempertures ranging from −10° to +70°C, generally at a temperature around room temperature.

The cross-linked membranes according to the invention are kept in water or equilibrated in aqueous solutions of NaCl.

These membranes may also be preserved in the dry state without suffering any permanent deformations or ruptures, and retaining their initial electrical and mechanical properties.

According to the process of the invention, it is possible to prepare membranes that are permoselective to anions, having at least two dimensions larger than 1 cm, in which the nitrogen atoms are present in polymeric chains arranged according to a tridimensional cross-linked structure.

The membranes according to the present invention may be prepared in thicknesses varying over a wide range, generally greater than 20 microns and may be conveniently used in multichamber cells for electrodialysis and, in reduced sizes, in standard ion exchange columns. Such membranes are solid, homogeneous and, in particular, exhibit a proper water absorption degree (generally around 30 percent).

The mechanical properties of these membranes are very good and may be further improved by employing a reinforcing material or by making use of a suitable support.

To this purpose, natural, artificial or synthetic fibers, obtained from organic and inorganic polymers, or fabrics prepared from such fibers may be used. The membranes of the invention exhibit excellent properties of adhesion to or compatibility with such fibers or fabrics.

Particularly advantageous results are attained by using fabrics made of fiberglass, fibers of polyesters, polyamides, polyolefins, vinyl polymers and the like.

The membranes according to the invention are characterized by low electrical resistance and by a high exchange capacity, which may be varied over a wide range by suitably regulating the concentration of the diallyldialkylammonium compound during the preparation of the polymer.

The ion exchange capacity of the membranes according to the invention is generally greater than 0.3, and preferably is between 1.0 and 3.5 milliequivalents per gram of dry product.

The membranes according to the invention which are quaternized in the chloride form have an electrical conductivity generally higher than $1 \times 10^{-4}$ ohm$^{-1}$ cm$^{-1}$. These membranes exhibit a high permoselectivity to anions, as evidenced by the high potential developed by such membranes when they are placed in standard cells of the type:

calomel electrode
saturated KCl saline bridge
KCl 0.2 molal solution
membrane according to the invention in the Cl$^-$ form
KCl 0.1 molal solution
saturated KCl saline bridge
calomel electrode.

In fact, at 25°C it is possible to measure a concentration potential very close to the ideal thermodynamic value of 16.08 mV. (In other words, the membranes according to this invention are characterized by transfer numbers which are very near unity).

The membranes according to the invention may be used in all the processes in which an ion exchange occurs, such as, for example, in the demineralization of water, in the recovery and concentration of radioactive materials or of light metals, in the purification of proteins and sugar solutions and in demineralization processes in general. In particular, the membranes according to the invention may be suitably employed for demineralizing sea water and brackish water.

DESCRIPTION OF THE PREFERRED EMBODIMENTS

The following examples are given in order to illustrate the invention without, however, limiting the invention thereto.

EXAMPLE 1

A. Terpolymer preparation 64.5 g of diallyldiethylammonium chloride, 115 ml of dimethylsulphoxide, 24.5 ml of methylvinylketone and 19.5 ml of vinylidene chloride were introduced, under a nitrogen atmosphere, into a 250 ml flask. The whole mass was stirred until the solution became perfectly homogeneous. Then, 0.7 g of $(NH_4)_2S_2O_8$ were introduced and stirring was continued for 24 hours at a temperature of 50°C.

Then the mass was poured into boiling acetone and the solid polymer which separated out was repeatedly washed with hot acetone and finally purified by dissolution in methanol and by reprecipitation with ethyl ether.

The obtained product was dried under reduced pressure and amounted to 30 g. It had an inherent viscosity $\eta_{in}$ (determined in dimethylformamide at 30°C) of 0.62 dl/g, and elemental analysis thereof yielded the following data: N = 4.8%; Cl = 24.4%.

The molar composition of the resulting terpolymer was therefore: diallyldiethylammonium chloride = 44.2%, vinylidene chloride = 22.0% and methylvinylketone = 33.8%.

This terpolymer was soluble in dimethylformamide, dimethylsulphoxide and methanol, and was insoluble in aliphatic and aromatic hydrocarbons, ethers and ketones.

B. Membrane preparation 10 g of the terpolymer prepared as in part (A) of this example were dissolved, at 20°C, in 12 cc of dimethylformamide. The solution thus obtained was then spread onto a flat glass plate by means of a film-spreader, placed into an oven at 50°C and left there for 15 hours. To effect cross-linking, the temperature in the oven was gradually increased to 120°C and maintained thereat for about 8 hours. A 2.3 mm thick membrane, which was insoluble and hardly swellable in any solvents, was thereby obtained.

C. Membrane characteristics

The membrane prepared in part (B) of this example, after washing with HCl, water and, finally with a 1 N solution of NaCl, was observed to be rather stiff and relatively brittle, and had the characteristics set forth in Table I.

TABLE I

| Properties | Test Procedure | Value |
|---|---|---|
| Electrical resistance | (1) | 8.3 ohm cm² |
| Transfer number $t_{cl}$ | (2) | 0.94 |
| Exchange capacity (dry resin) | (3) | 1.9 meq/g |
| Water absorption | (4) | 28% by weight |

(1) In an 0.5 N NaCl aqueous solution at 25± 0.1°C, in accordance with the process described in "Test Manual for Permoselective Membranes" - Method 601-1, page 156 O.S.W., Report No. 77.
(2) In an 0.5/0.25 N NaCl aqueous solution, in accordance with the process described in "Test Manual for Permoselective Membranes" Method 602-1, page 163 O.S.W., Report No. 77.
(3) Procedure described in "Test Manual for Permoselective Membranes" Method 502-1, page 132 O.S.W., Report No. 77.
(4) Procedure described in "Test Manual for Permoselective Membranes" Method 412-1, page 120 O.S.W., Report No. 77.

EXAMPLE 2

The terpolymer of Example 1(A) was made into a solution as set forth in Example 1(B). To this solution was added 1 g of terephthalic aldehyde. The solution was then spread onto a glass plate and placed into an oven at 50°C for 15 hours.

Subsequently, the oven temperature was gradually increased to 100°C and maintained thereat for about 4 hours.

A membrane having a thickness of 235 micron was obtained thereby.

This membrane, after washing with HCl, water and, finally, a 1 N aqueous solution of NaCl, was homogeneous, solid and rather flexible, and had the properties set forth in Table II.

TABLE II

| Properties | Test Procedure | Value |
|---|---|---|
| Electrical resistance | (1) | 2.7 ohm cm² |
| Transfer number | (2) | 0.98 |
| Exchange capacity (dry resin) | (3) | 1.9 meq/g |
| Water absorption | (4) | 30% |

(1), (2), (3) and (4): see footnotes to Table I.

EXAMPLE 3

10 g of a terpolymer prepared according to Example 1(A) were dissolved, at 20° C, in 12 cc of dimethylformamide and the thus obtained solution was admixed with 0.5 g of terephthalic aldehyde.

The thus prepared solution was spread onto a glass plate and placed in an oven for 15 hours at 50°C and then for 8 hours at 120°C. The obtained membrane, having a thickness of 0.3 mm, was washed with HCl, water and a 1 N solution of NaCl. The membrane was rather stiff and relatively brittle and had the properties set forth in Table III.

TABLE III

| Properties | Test Procedure | Value |
|---|---|---|
| Electrical resistance | (1) | 8.5 ohm cm² |
| Transfer number | (2) | 0.98 |
| Exchange capacity (dry resin) | (3) | 2.0 meq/g |
| Water absorption | (4) | 29% |

(1), (2), (3) and (4): see footnotes to Table I.

EXAMPLE 4

A. Terpolymer preparation 6.6 g of diallyldiethylammonium chloride, 12 ml of dimethylsulphoxide, 2.5 ml of vinylidene chloride, 2 ml of methylvinylketone and 0.15 g of $(NH_4)_2S_2O_8$ were introduced into a 50 ml flask.

After 25 hours of polymerization at 50°C, by operating according to the method described in Example 1(A), 6.5 g of a solid terpolymer were isolated. The elemental analysis of the terpolymer yielded the following data: nitrogen = 3.25% by weight and chlorine = 29.2% by weight. These data correspond to the following molar percentage composition:

| diallyldiethylammonium chloride | 25.3 | mol % |
| methylvinylketone | 42.4 | do. |
| vinylidene chloride | 32.3 | do. |

This terpolymer had an inherent viscosity (measured in dimethylformamide at 30°C) $\eta_{in}$ of 0.3 dl/g and was soluble in dimethylformamide, dimethylsulphoxide and methanol, while it was insoluble in aliphatic and aromatic hydrocarbons, and in ethers and ketones.

B. Membrane preparation 10 g of the terpolymer prepared as described in Example 4(A) were dissolved in 15 cc of dimethylformamide, and 1 g of terephthalic aldehyde was added thereto.

The solution was spread onto a glass plate and placed into an oven at 50°C for 15 hours and then at 100°C for about 4 hours.

The thus obtained membrane, having a thickness of 0.3 mm, after washing with HCl, water and a 1 N aqueous solution of NaCl, was homogeneous, solid, rather flexible and had the properties set forth in Table IV.

TABLE IV

| Properties | Test Procedure | Value |
|---|---|---|
| Electrical resistance | (1) | 13.5 ohm cm² |
| Transfer number | (2) | 0.87 |
| Exchange capacity (dry resin) | (3) | 1.1 meq/g |
| Water absorption | (4) | 20% |

(1), (2), (3) and (4): see footnotes to Table I.

EXAMPLE 5

Polyethylene terephthalate cloths having a free area of 50% were immersed in a solution of the terpolymer described in Example 1(A), prepared according to the procedures of Example 2.

The cloths impregnated with said solution were placed into an oven, left there for about 1 hour at 80°C and for 4 hours at 100°C.

The thus obtained membrane, having a thickness of 220 microns, after washing with HCl, water and, finally, with a 1 N aqueous solution of NaCl, was homogeneous, solid, very flexible and had the properties set forth in Table V.

TABLE V

| Properties | Test Procedure | Value |
|---|---|---|
| Electrical resistance | (1) | 2.8 ohm cm$^2$ |
| Transfer number | (2) | 0.97 |
| Exchange capacity (dry resin) | (3) | 1.9 meq/g |
| Water absorption | (4) | 30% |

(1), (2), (3) and (4): see footnotes to Table I

EXAMPLE 6

A series of membrane samples, prepared according to Example 2, were immersed in 1 N NaOH for 1 month at 20°C, in order to determine the stability of the membrane in an alkaline medium.

The characteristics determined on such samples every 10 days are reported in Table VI.

TABLE VI

| Properties | Test Procedure | Value (5) After 10 days | After 20 days | After 30 days |
|---|---|---|---|---|
| Thickness |  | 235 | 235 | 235 micron |
| Electrical resistance | (1) | 2.7 | 2.5 | 2.8 ohm cm$^2$ |
| Transfer number | (2) | 0.98 | 0.97 | 0.90 |
| Exchange capacity (dry resin) | (3) | 1.9 | 2.0 | 1.9 meq/g |
| Water absorption | (4) | 30.0 | 30.5 | 29% |

(1), (2), (3) and (4): see footnotes to Table I.
(5) Average Values

Variations and modifications can, of course, be made without departing from the spirit and scope of the invention.

Having thus described my invention, what I desire to secure by Letters Patent and hereby claim is:

1. High molecular weight linear copolymers consisting essentially of, in chemically combined form:

A. from 15 to 85 mol % of at least one diallyldialkylammonium compound of the formula $$\left[ \begin{array}{c} H_2C = CH-H_2C \\ \\ H_2C = CH-H_2C \end{array} \diagdown N^{(+)} \diagup \begin{array}{c} R_1 \\ \\ R_2 \end{array} \right] X^{(-)} \quad (I)$$

wherein $R_1$ and $R_2$ are independently selected from the group consisting of lower alkyl, halogen substituted lower alkyl and phenyl, and X is OH, a halogen or an inorganic or organic anion;

B. from 5 to 80 mol % of at least one alkenyl monomer having the formulae (II) or (III)

$$CO \diagdown \begin{array}{c} CH = CHR_4 \\ \\ R_3 \end{array} \quad (II) \qquad CO \diagdown \begin{array}{c} R_4 \\ | \\ C = CH_2 \\ \\ R_3 \end{array} \quad (III)$$

wherein $R_3$ and $R_4$ are independently selected from the group consisting of hydrogen, lower alkyl and halogen substituted lower alkyl; and C. from 5 to 50 mol % of at least one halogen containing vinyl monomer selected from the group consisting of vinylidene chloride, α-chloroacrylonitrile and mixtures thereof;

said high molecular weight linear copolymers having an inherent viscosity, measured in dimethylformamide at 30°C. of between 0.1 and 2.5 dl/g.

2. A copolymer according to claim 1, which has been cross-linked by heating in the presence of between 0.1 and 10% by weight of at least one bifunctional ketone or aldehyde.

3. An anion permoselective membrane consisting of a heat cross-linked copolymer according to claim 1.

4. A membrane according to claim 3, wherein said copolymers contain from 1.5 to 10% by weight of nitrogen and from 10 to 50% by weight of chlorine.

5. A membrane according to claim 4, wherein the diallyldialkylammonium compound is a diallyldialkylammonium chloride, the alkenyl monomer is methylvinylketone and the copolymer is constituted by:

10 to 55 mol % of diallydialkylammonium chloride,
   5 to 80 mol % of methylvinylketone, and
   5 to 50 mol % of vinylidene chloride.

6. A process for preparing an anion permoselective membrane which comprises, in order, the following steps:

a. preparing a solution, in an organic solvent, of a linear copolymer according to claim 1;
b. casting the solution onto a flat plate and thereafter evaporating the solvent at a temperature below 100°C to form a membrane; and
c. cross-linking the formed membrane by heating same at a temperature ranging from 80° to 180°C.

7. A process according to claim 6, wherein the copolymer comprises from 5 to 60% by weight of the copolymer solution.

8. A process according to claim 6, wherein there is added to the solution, from 0.1 to 20 parts per hundred parts of copolymer of a bifunctional ketone or aldehyde.

9. A process according to claim 6, wherein step (b) is carried out at a temperature between 40° and 80°C, for from 30 minutes to 24 hours.

10. A process according to claim 6, wherein step (c) is carried out at a temperature ranging from 110° to 180°C, for from 8 to 24 hours.

11. A process according to claim 8, wherein step (c) is carried out at a temperature ranging from 80° to 120°C, for between 30 minutes and 8 hours.

12. A process according to claim 11, wherein said bifunctional ketone or aldehyde is incorporated into the membrane during the preparation of the copolymer solution in step (a).

* * * * *

PO-1050
(5/69)

UNITED STATES PATENT OFFICE
CERTIFICATE OF CORRECTION

Patent No. 3,862,059  Dated January 21, 1975

Inventor(s) Francesco GRECO et al

It is certified that error appears in the above-identified patent and that said Letters Patent are hereby corrected as shown below:

Column 1, line 46: "tetrallylammonium" should read -- tetraallylammonium --.

Column 3, line 69: "diallydiethylammonium" should read -- diallyldiethylammonium --.

Column 4, lines 65-66: "tempertures" should read -- temperatures --.

Column 7, line 5: "dimethylforamide," should read -- dimethylformamide, --.

Column 9, line 48: "membrane" should read -- membranes --.
Column 9, line 68: "Latters Patent" should read -- Letters Patent --.

Column 10, lines 2-3 of claim 5: "diallydialkylammonium chloride" should read -- diallyldialkylammonium chloride --. Column 10, line 5 of claim 5: "diallydialkylammonium chloride" should read -- diallyldialkylammonium chloride --.

Signed and sealed this 22nd day of April 1975.

(SEAL)
Attest:

RUTH C. MASON
Attesting Officer

C. MARSHALL DANN
Commissioner of Patents
and Trademarks